United States Patent
Lin et al.

(10) Patent No.: US 9,992,789 B1
(45) Date of Patent: Jun. 5, 2018

(54) SOUNDING METHOD AND WIRELESS COMMUNICATION SYSTEM

(71) Applicant: MEDIATEK INC., Hsin-Chu (TW)

(72) Inventors: Ying-You Lin, Taoyuan (TW); Yu-Ju Lee, Miaoli County (TW); Chih-Kun Chang, New Taipei (TW); Chih-Wei Kang, Taipei (TW); Hsi-Chang Yang, Hsinchu County (TW); Pu-Hsuan Lin, Tainan (TW)

(73) Assignee: MEDIATEK INC., Hsin-Chu (TW)

( * ) Notice: Subject to any disclaimer, the term of this patent is extended or adjusted under 35 U.S.C. 154(b) by 85 days.

(21) Appl. No.: 14/975,869

(22) Filed: Dec. 21, 2015

Related U.S. Application Data

(60) Provisional application No. 62/150,308, filed on Apr. 21, 2015.

(51) Int. Cl.
| | |
|---|---|
| *H04L 12/26* | (2006.01) |
| *H04W 72/12* | (2009.01) |
| *H04L 25/02* | (2006.01) |
| *H04W 4/08* | (2009.01) |
| *H04L 1/00* | (2006.01) |

(52) U.S. Cl.
CPC ....... *H04W 72/1231* (2013.01); *H04L 1/0071* (2013.01); *H04L 25/0224* (2013.01); *H04W 4/08* (2013.01)

(58) Field of Classification Search
CPC ............... H04L 25/0224; H04W 4/08; H04W 72/1226; H04W 72/1231
USPC ......................................................... 370/329
See application file for complete search history.

(56) References Cited

U.S. PATENT DOCUMENTS

| | | | | |
|---|---|---|---|---|
| 9,363,774 | B2 * | 6/2016 | Kang | H04L 5/0023 |
| 2011/0261708 | A1 * | 10/2011 | Grandhi | H04W 24/10 370/252 |
| 2011/0274003 | A1 * | 11/2011 | Pare, Jr. | H04B 7/0452 370/252 |
| 2012/0327914 | A1 * | 12/2012 | Kang | H04L 5/0023 370/336 |
| 2013/0034003 | A1 * | 2/2013 | Shapira | H04L 1/0027 370/252 |
| 2014/0056163 | A1 * | 2/2014 | Kwon | H04W 24/10 370/252 |
| 2014/0092819 | A1 * | 4/2014 | Du | H04B 7/0452 370/329 |
| 2014/0098701 | A1 * | 4/2014 | Sohn | H04B 7/065 370/252 |
| 2014/0269964 | A1 * | 9/2014 | Du | H04B 7/0452 375/267 |
| 2015/0245360 | A1 * | 8/2015 | Gao | H04B 7/0452 370/329 |

(Continued)

*Primary Examiner* — Andrew W Chriss
*Assistant Examiner* — Lalita W Pace
(74) *Attorney, Agent, or Firm* — Winston Hsu

(57) ABSTRACT

A sounding method utilized for a wireless communication system is disclosed. The sounding method comprises classifying a plurality of stations of the wireless communication system into a plurality of groups, and determining a plurality of initial sounding instants and a plurality of sounding periods corresponding to the plurality of groups; and performing sounding to at least one or all of the plurality of groups in a group by group fashion according to the plurality of initial sounding instants and the plurality of sounding periods.

12 Claims, 5 Drawing Sheets

(56) References Cited

U.S. PATENT DOCUMENTS

2016/0295581 A1* 10/2016 Ghosh ............... H04W 72/0446
2017/0085410 A1* 3/2017 Lin .................... H04L 27/3405

* cited by examiner

SOUNDING METHOD AND WIRELESS COMMUNICATION SYSTEM

CROSS REFERENCE TO RELATED APPLICATIONS

This application claims the benefit of U.S. provisional application No. 62/150,308, filed on Apr. 21, 2015 and incorporated herein by reference.

BACKGROUND

The present invention relates to a sounding method and a wireless communication system, and more particularly, to a sounding method and a wireless communication system capable of classifying stations into groups and performing sounding in a group by group fashion.

As a demand for wireless service increases, a very high throughput (VHT) wireless communication system is required for providing more wireless service and faster data transmission rate in the future. In a VHT system, such as IEEE 802.11ac, a multi-user multiple input multiple output (MU-MIMO)/beamforming technology is adopted to enhance a system transmission rate of the VHT system. The MU-MIMO/beamforming technology is able to provide multiple data streams to multiple stations (or users) at the same time. Specifically, the MU-MIMO/beamforming technology allows a base station equipped with multiple antennas to form multiple spatial beams toward multiple stations to provide the multiple data streams to the multiple stations, respectively, such that the system performance, e.g., transmission rate, of the VHT system is enhanced.

Performance of the MU-MIMO/beamforming technology relies on accurate channel state information (CSI) obtained at the base station. The base station needs to perform sounding with the stations, which is a procedure involving the stations sending their CSI back to the base state, before performing data transmission via beamforming. For example, please refer to FIG. 1, which is a schematic diagram of a sounding procedure 10 with respect to time t in the prior art. As shown in FIG. 1, a base station broadcasts a null data packet (NDP) announcement and an NDP to all stations to initial the sounding procedure. Then, the base station would designate one station at a time, by sending a beamforming report poll or the NDP announcement, and the designated station would send back the CSI through a compressed beamforming packet to the base station. After the base station receives the CSIs from all the stations, the base station produces a steering pre-coder matrix to steer the multiple spatial beams to multiple stations and performs data transmission. In other words, each user needs to wait until all stations finish sending their CSIs to the base station, and then receives data transmitted from the base station. A length of a sounding overhead, which is a time period from the base station sending the NDP announcement to the base station starting to transmit data, is so long that system performances, such as throughput, delay jitter, quality of service (QoS) requirement, etc., are degraded. In addition, the length of the sounding overhead is even longer when a number of stations increases. The sounding protocol in the prior art lacks a mechanism of limiting the number of stations to prevent the sounding overhead from being increased. Therefore, the prior art needs to be improved.

SUMMARY

It is therefore a primary objective of the present invention to provide a sounding method and a wireless communication system, to improve over disadvantages of the prior art.

An example of the present invention discloses a sounding method, utilized for a wireless communication system. The sounding method comprises classifying a plurality of stations of the wireless communication system into a plurality of groups, and determining a plurality of initial sounding instants and a plurality of sounding periods corresponding to the plurality of groups; and performing sounding to at least one of the plurality of groups according to the plurality of initial sounding instants and the plurality of sounding periods.

An example of the present invention discloses a wireless communication system. The wireless communication system comprises a plurality of stations; abase station, comprising a processing unit and a storage unit, the storage unit configured to store a program code, the program code instructing the processing unit to perform the following step: classifying the plurality of stations into a plurality of groups, and determining a plurality of initial sounding instants and a plurality of sounding periods corresponding to the plurality of groups; and performing sounding to at least one of the plurality of groups according to the plurality of initial sounding instants and the plurality of sounding periods.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
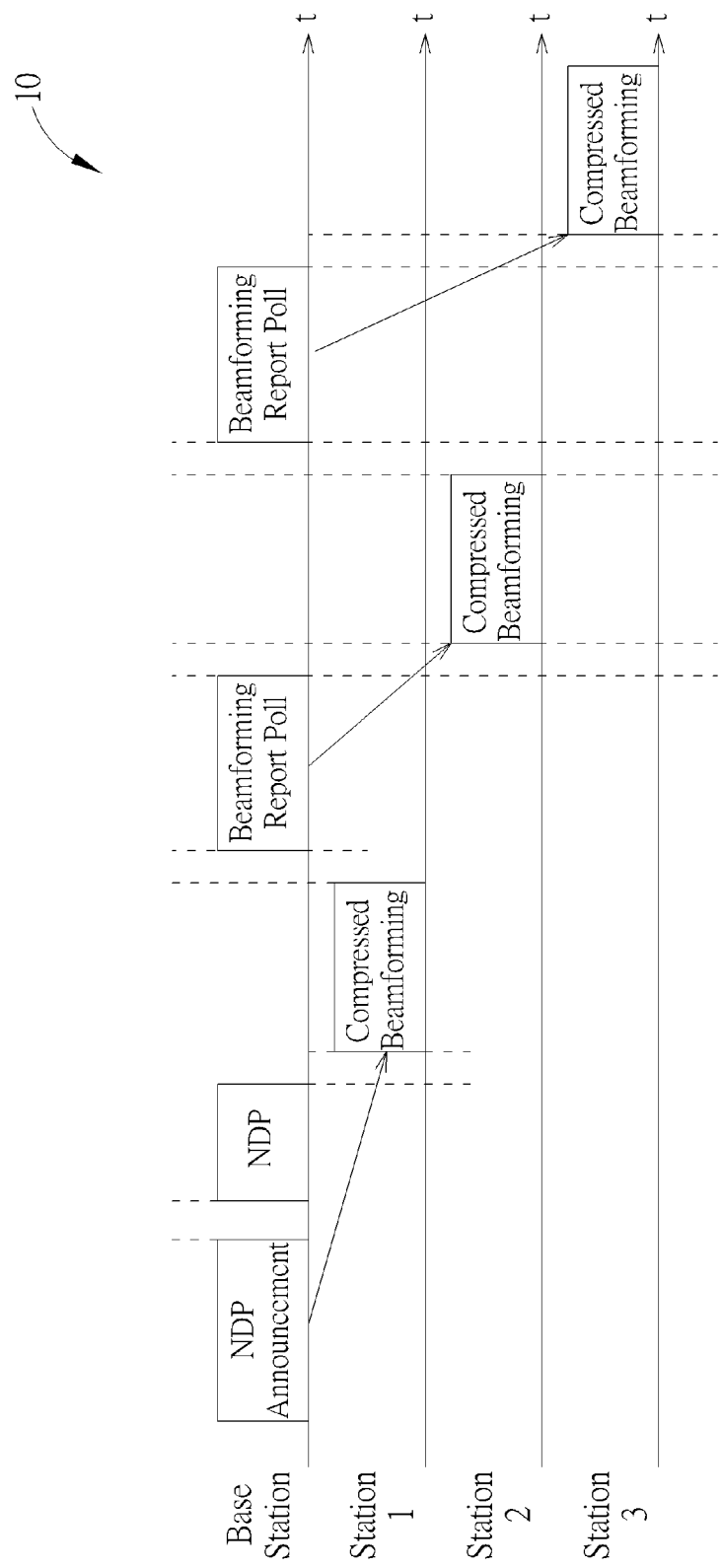
FIG. 1 is a schematic diagram of a sounding procedure in the prior art.
Figure 2:
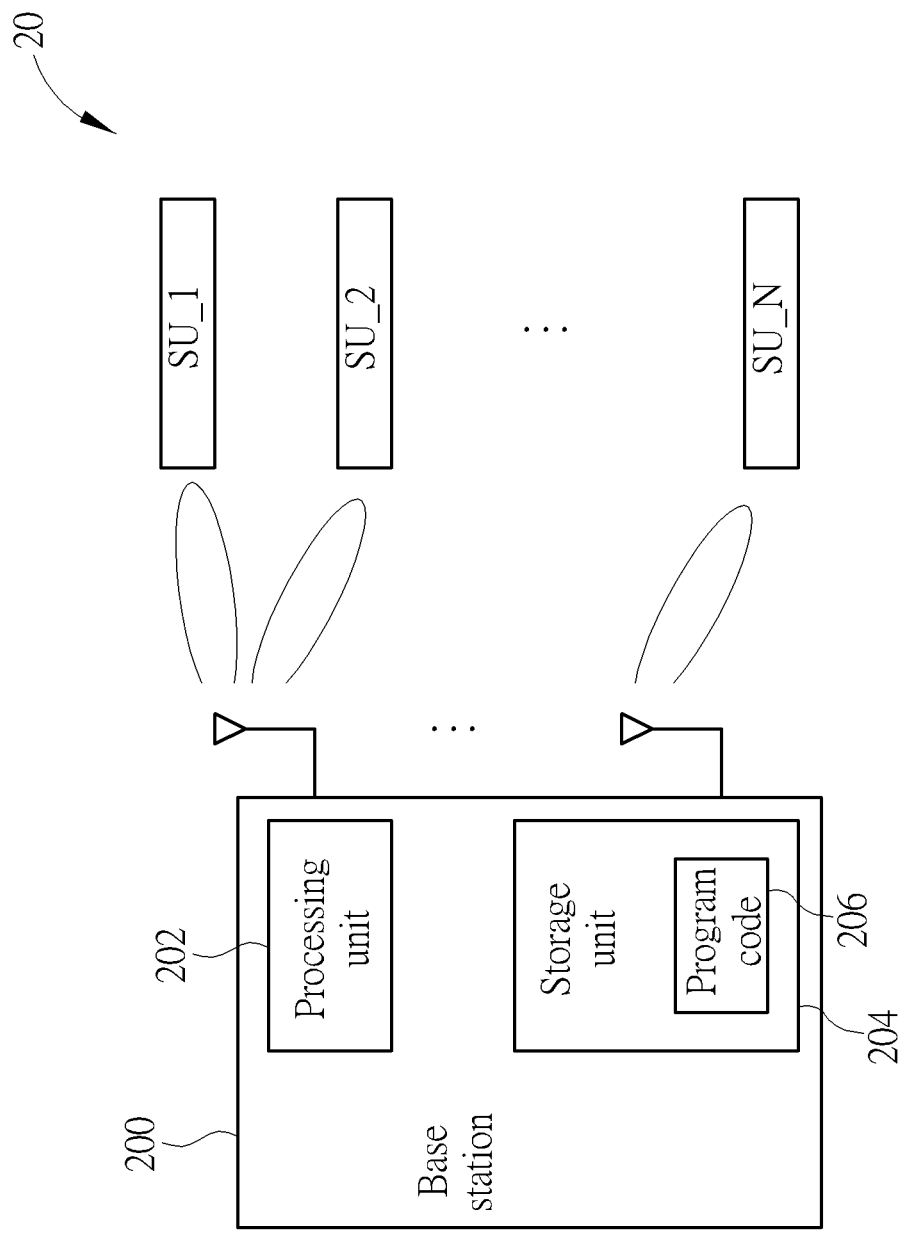
FIG. 2 is a schematic diagram of a wireless communication system according to an example of the present invention.

Please refer to FIG. 2, which is a schematic diagram of a wireless communication system 20 according to an example of the present invention. The wireless communication system 20 may be a wireless local area network (WLAN) system. The wireless communication system 20 may be a WLAN system based on IEEE 802.11ac or other standards. The wireless communication system 20 comprises a base station 200 and stations SU_1-SU_N. The base station 200 may be an access point (AP) in the WLAN system or a station operating in AP mode, equipped with multiple antennas. The base station 200 comprises a process unit 202 and a storage unit 204. The storage unit SU is utilized for storing a program code 206 to instruct the process unit PU to perform sounding with the stations SU_1-SU_N. The stations SU_1-SU_N may be electronic devices such as computers, notebooks, tablets, smart phones, smart watches, etc., which are wireless users served by the base station 200. The base station needs to perform sounding with the stations SU_1-SU_N, by broadcasting a null data packet (NDP) announcement and an NDP to the stations SU_1-SU_N and the stations SU_1-SU_N sending their corresponding channel state information (CSI) back to the base station 200, before the base station 200 performs data transmission via beamforming toward the stations SU_1-SU_N.

The CSIs of the stations SU_1-SU_N have different characteristics. For example, some stations of the stations SU_1-SU_N may have high mobility and the CSIs of the high mobility stations may vary fast. At the time that the base station 200 performs beamforming to transmit data to the high mobility stations, the CSIs sent from the high mobility stations may already be outdated, such that errors of the transmitted data might occur. In such a situation, sounding of the high mobility stations may be performed more frequently (with high sounding frequency). On the other hand, some stations of the stations SU_1-SU_N may have low mobility, which means that the CSIs of the low mobility stations are static and sounding of the low mobility stations may be performed less frequently (with low sounding frequency).

Therefore, in an example of the present invention, the base station 200 classifies the stations SU_1-SU_N into groups GP_1-GP_P. The base station 200 also determines initial sounding instants ts_1-ts_P and sounding periods TP_1-TP_P corresponding to the groups GP_1-GP_P. Then, the base station 200 performs sounding with at least one of the groups GP_1-GP_P, or with all the groups GP_1-GP_P in a group by group fashion, i.e., the base station 200 performs sounding with the groups GP_1-GP_P sequentially starting at the corresponding initial sounding instants is ts_1-ts_P and periodically with the corresponding sounding periods TP_1-TP_P. Moreover, sounding intervals of the groups GP_1-GP_P, which are time intervals of the base station 200 performing sounding with the groups GP_1-GP_P, are mutually interleaved, which means that there are time gaps between two consecutive sounding intervals. The base station may perform data transmission during the time gaps.

Figure 3:
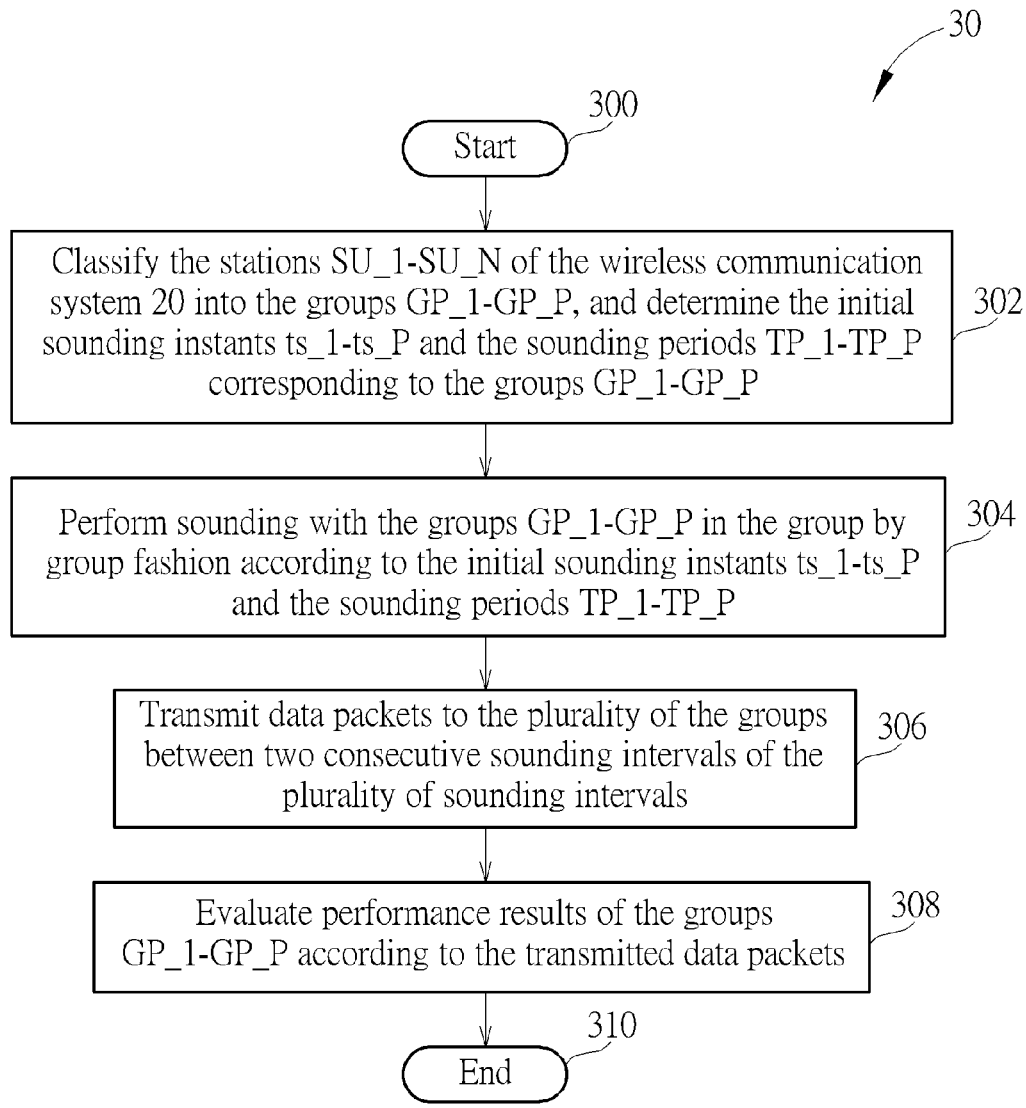
FIG. 3 is a schematic diagram of a sounding process according to an example of the present invention.

Operational principles of the base station 200 performing sounding described in the above may be summarized into a sounding process 30, as shown in FIG. 3. The sounding process 30 may be compiled as the program code 206 stored in the storage unit 204 and executed by the process unit 202. The sounding process 30 comprises following steps:

Step 300: Start.
Step 302: Classify the stations SU_1-SU_N of the wireless communication system 20 into groups GP_1-GP_P, and determine the initial sounding instants is ts_1-ts_P and the sounding periods TP_1-TP_P corresponding to the groups GP_1-GP_P.
Step 304: Perform sounding with the groups GP_1-GP_P in the group by group fashion according to the initial sounding instants is ts_1-ts_P and the sounding periods TP_1-TP_P.
Step 306: Transmit data packets to the plurality of the groups between two consecutive sounding intervals of the plurality of sounding intervals.
Step 308: Evaluate performance results of the groups GP_1-GP_P according to the transmitted data packets.
Step 310: End.

According to the sounding process 30, the base station 200 classifies the stations SU_1-SU_N into the groups GP_1-GP_P. Sounding of at least one or all the groups GP_1-GP_P is performed in the group by group fashion. Different groups of stations have different sounding periods (or different sounding frequencies). The sounding intervals of different group are mutually interleaved by properly determining the initial sounding instants is ts_1-ts_P. In addition, data may be transmitted during the time gaps between two consecutive sounding intervals, so as to alleviate the system performance degradation, such as throughput, delay jitter, quality of service (QoS) requirement, etc., brought by long sounding overhead.

Figure 4:
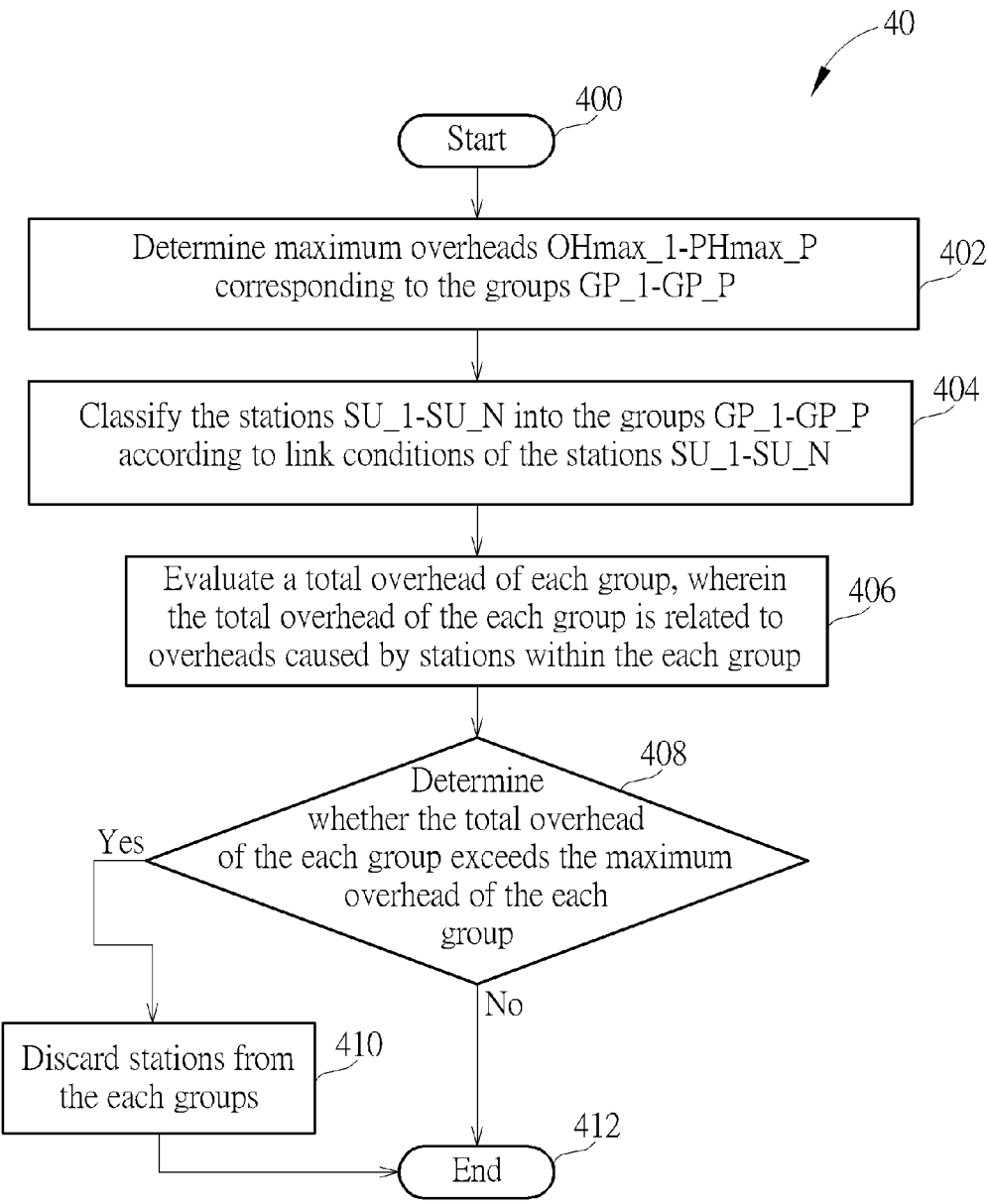
FIG. 4 is a schematic diagram of a classifying process according to an example of the present invention.

Specifically, in Step 302, the base station 200 classifies the stations SU_1-SU_N of the wireless communication system 20 into the groups GP_1-GP_P. Details of the base station 200 classifying the stations SU_1-SU_N into the groups GP_1-GP_P may be referred to FIG. 4, which is a schematic diagram of a classifying process 40 according to an example of the present invention. The classifying process 40 may be compiled as the program code 206 stored in the storage unit 204 and executed by the process unit 202. The sounding process 40 comprises following steps:

Step 400: Start.
Step 402: Determine maximum overheads OHmax_1-PHmax_P corresponding to the groups GP_1-GP_P.
Step 404: Classify the stations SU_1-SU_N into the groups GP_1-GP_P according to link conditions of the stations SU_1-SU_N.
Step 406: Evaluate a total overhead of each group, wherein the total overhead of the each group is related to overheads caused by stations within the each group.
Step 408: Determine whether the total overhead of the each group exceeds the maximum overhead of the each group. If yes, go to Step 410, otherwise, go to Step 412.
Step 410: Discard stations from the each groups.
Step 412: End.

According to the classifying process 40, in Step 402, the base station 200 may determine the maximum overheads OHmax_1-PHmax_P corresponding to the groups GP_1-GP_P. The maximum overheads OHmax_1-PHmax_P are utilized for limiting numbers of stations in the groups GP_1-GP_P, which are narrated afterward. In Step 404, the base station 200 classifies the stations SU_1-SU_N into the groups GP_1-GP_P according to the link conditions of the stations SU_1-SU_N, wherein the link conditions may be one or more indices of transmission rate, packet error rate (PER), and mobility of the stations SU_1-SU_N. For example, in an example, the stations SU_1-SU_N are classified into the groups GP_1-GP_P according to the mobility of the stations SU_1-SU_N. In other words, stations with high mobility are classified as a high mobility group, stations with middle mobility are classified as a middle mobility group, and stations with low mobility are classified as a low mobility group.

For each of the groups GP_1-GP_P, in Step 406 to Step 410, the base station 200 evaluates the total overhead of the each group, and compares the total overhead of the each group with the maximum overhead of the each group. The total overhead of the each group may be a time period of the stations within the each group performing sounding with the base station 200, and may be evaluated according to a round trip airtime consumed by each station within the each group for performing sounding, wherein the round trip airtime is a time period from the base station transmitting a polling packet in order to designate a station until the base station receives the CSI from the designated station and may be regarded as a kind of overhead of the station for performing sounding. The total overhead of the each group may be related to an accumulation of the airtime of the stations within the each group. Hence, the more stations within the each group, the larger the total overhead of the each group.

If the total overhead of the each group is greater than the maximum overhead of the each group, the base station 200 may discard part of stations within the each group (Step 410), such that the resulting total overhead of the each group, which may be evaluated according to the accumulation of overheads (or airtime) of remaining stations within the each group, is smaller than the maximum overhead of the each group. For example, supposed that the stations SU_1-SU_3 are within the group GP_1 and each of the stations SU_1-SU_3 requires 5 millisecond (ms) to perform sounding with the base station 200, which means the total overhead of the group GP_1 is 15 ms, nevertheless, the maximum overhead of the group GP_1 is only 12 ms. The base station 200 may discard one station in the group GP_1, such that the resulting overhead of the each group reduces to 10 ms. From another perspective, the maximum overhead of the each group is utilized for limiting the number of stations within the each group, preventing the total overhead of the each group from being too long to degrade the system performance, such as throughput, delay jitter, quality of service (QoS) requirement, etc. Methods for the base station 200 to discard which part of stations within the each group may be determined according to different system requirements. For example, the base station 200 may arrange an ordering list according to characteristics of the stations, such as multi-user gain, signal-to-noise ratio (SNR), PER, etc., of the stations, and discard stations according to the ordering list. Those skilled in the art may make modifications and alternations accordingly, and not limited herein.

In addition, in step 302, the base station 200 further determines the initial sounding instants is ts_1-ts_P and the sounding periods TP_1-TP_P corresponding to the groups GP_1-GP_P. The initial sounding instants is ts_1-ts_P are utilized for interleaving the sounding intervals of the groups GP_1-GP_P. The sounding periods TP_1-TP_P, related to sounding frequencies of the groups GP_1-GP_P, may be determined according to the link conditions of the groups GP_1-GP_P. In an example, a sounding period for a high mobility group, consisted of high mobility stations among the stations SU_1-SU_N, may be determined to be short, and a sounding period for a low mobility group, consisted of low mobility stations among the stations SU_1-SU_N, may be determined to be longer. For example, a sounding period for the high mobility group may be determined to be 20 ms, a sounding period for a moderate mobility group, consisted of middle mobility stations among the stations SU_1-SU_N, may be determined to be 40 ms, and a sounding period for the low mobility group may be determined to be 80 ms.

Figure 5:
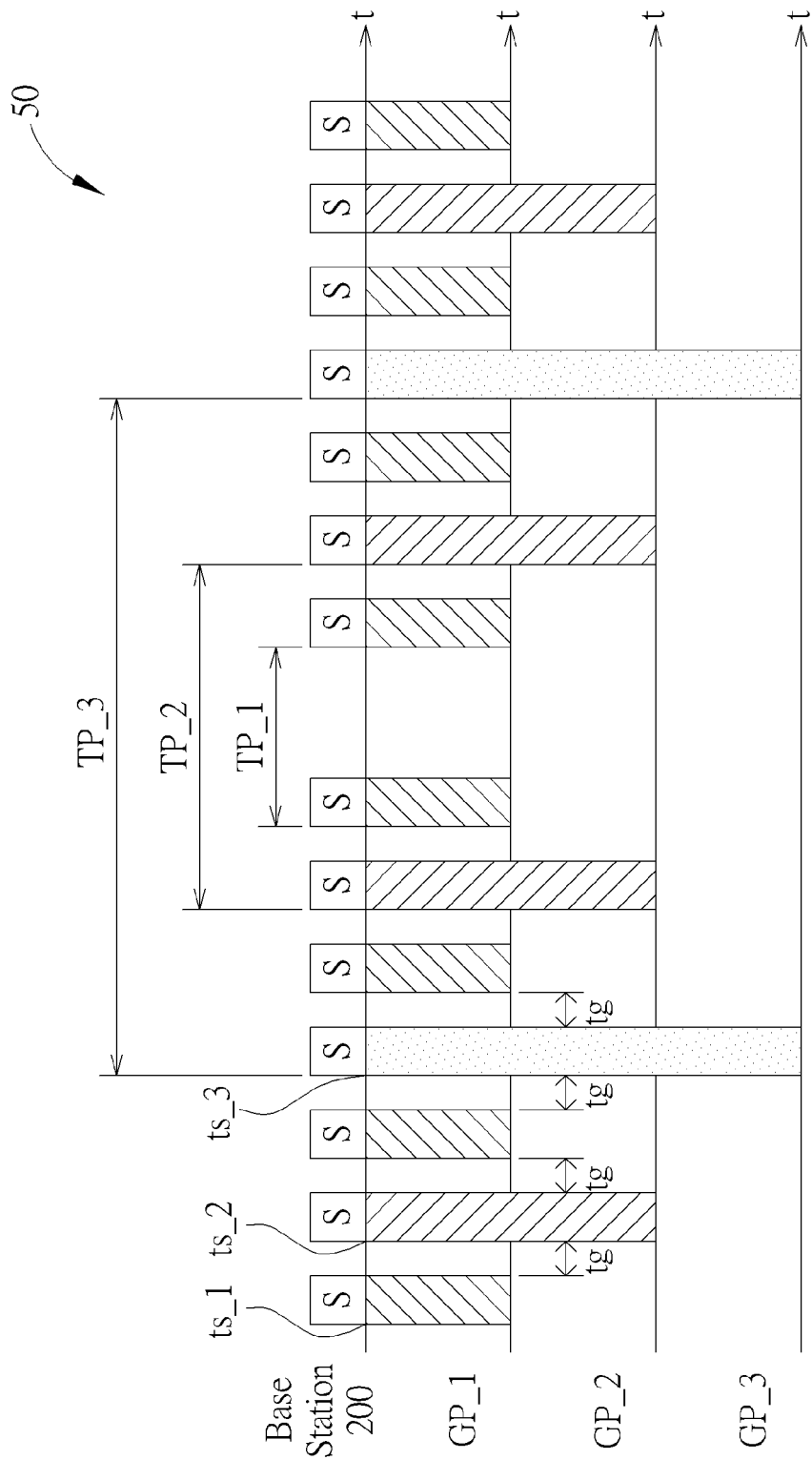
FIG. 5 is a schematic diagram of a sounding procedure according to an example of the present invention.

In step 304 to Step 306, the base station 200 performs sounding with at least one or all of the groups GP_1-GP_P in the group by group fashion according to the initial sounding instants ts_1-ts_P and the sounding periods TP_1-TP_P, i.e., the base station 200 performs sounding with the groups GP_1-GP_P sequentially starting at the initial sounding instants ts_1-ts_P and periodically with the sounding periods TP_1-TP_P. In the meantime, the base station 200 transmits data packets during the time gaps between any two consecutive sounding intervals. For example, please refer to FIG. 5, which is a schematic diagram of a sounding procedure 50 with respect to time t according to an example realizing the sounding process 30. In the example of FIG. 5, the stations SU_1-SU_N are classified into three groups, i.e., the groups GP_1-GP_3. Sounding of the groups GP_1-GP_3 is determined to be started at the initial sounding instants ts_1-ts_3 and performed periodically with the corresponding sounding periods TP_1-TP_3. As shown in FIG. 5, sounding of the group GP_1 is performed most frequently, sounding of the group GP_2 is performed less frequently, and sounding of the group GP_3 is performed least frequently. During the time gaps tg between two consecutive sounding intervals, data packets may be transmitted. Preferably, during the time gaps tg, data packets are transmitted to the group from which the base station receives the latest CSI.

In Step 308, the base station 200 evaluates the performance results of the groups GP_1-GP_P according to the data packets transmitted between the time gaps tg. The performance results of the groups GP_1-GP_P may be throughput values, in terms of bits per second, experienced by the groups GP_1-GP_P. The performance results of the groups GP_1-GP_P may be evaluated and stored in the storage unit 204. In an example, the performance results of the groups GP_1-GP_P may be goodput values experienced by the groups GP_1-GP_P, wherein the goodput value of the groups GP_x represents an amount of data successfully transmitted to the groups GP_x during a specific time interval. In another example, the performance results of the groups GP_1-GP_P may also be delay jitter or any other QoS requirements experienced by the groups GP_1-GP_P, and not limited herein.

In addition, in an example, the sounding process 30 may be repeatedly executed by the process unit 202 of the base station 200, so as to re-classify the stations SU_1-SU_N into the groups GP_1-GP_P and update sounding parameters, such as the sounding periods, the maximum overheads, etc., of the groups GP_1-GP_P, in order to achieve better system performance. In such a situation, determining the maximum overheads OHmax_1-PHmax_P (in Step 402) in the current execution of the sounding process 30 may be related to the performance results of the groups GP_1-GP_P previously evaluated (in Step 308). In other words, the maximum overheads OHmax_1-PHmax_P in the current execution of the sounding process 30 may be determined according to the performance results previously evaluated, so as to achieve better system performance, such as throughput, delay jitter, quality of service (QoS) requirement, etc.

In the prior art, the sounding overhead increases as a number of stations in a wireless communication system increases, and the sounding overhead is so long that the system performance, such as throughput, delay jitter, QoS requirement, etc., are degraded. In comparison, the sounding process in the present invention utilizes the maximum overheads to limit the number of stations when performing sounding, so as to prevent the sounding overhead from being increased as the number of station increases.

Notably, the examples described in the above are for illustrating purpose. Those skilled in the art may make modifications and alternations accordingly, and not limited herein. For example, the base station 200 may determine the mobility of the station SU_1-SU_N by estimating Doppler frequencies of physical wireless channels between the base station 200 and the station SU_1-SU_N, or by computing coherence times of the physical wireless channels between the base station 200 and the station SU_1-SU_N, not limited herein. Details of estimation on Doppler frequency and computation of coherence time is known by those skilled in the art, which are not narrated herein. In addition, the process unit 202 may be implemented by a central processing unit (CPU), a microprocessor, or via application-specific integrated circuit (ASIC), which is not limited herein. The storage unit 204 may be read-only memory (ROM), random-access memory (RAM), CD-ROMs, magnetic tapes, floppy disks, optical data storage devices, etc., and not limited herein.

In summary, the sounding process in the present invention classifies the stations into groups, and performs sounding to at least one or all in the group by group fashion, such that different group of stations may have different sounding periods/sounding frequencies. The sounding process in the present invention further transmits data in the time gaps between two consecutive sounding intervals, to alleviate the system performance degradation, such as throughput, delay jitter, quality of service (QoS) requirement, etc., brought by sounding overhead. In addition, the sounding process in the present invention utilizes the maximum overheads to limit the number of stations when performing sounding, and the maximum overheads are determined according to the performance results previously evaluated.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sounding method, utilized for a wireless communication system, the method comprising:
   classifying a plurality of stations of the wireless communication system into a plurality of groups, and determining a plurality of initial sounding instants and a plurality of sounding periods corresponding to the plurality of groups; and
   performing sounding to at least one of the plurality of groups according to the plurality of initial sounding instants and the plurality of sounding periods;
   wherein the step of classifying the plurality of stations into the plurality of groups comprises:
      determining a plurality of maximum overheads corresponding to the plurality of groups;
      classifying the plurality of stations into the plurality of groups according to link conditions of the plurality of stations;
      evaluating a total overhead of each group of the plurality of groups, wherein the total overhead of each group of the plurality of groups is an accumulation of a plurality of airtime consumed by stations to perform sounding within each group of the plurality of groups; and
      discarding stations which have been classified into each group of the plurality of groups from each group of the plurality of groups when the total overhead of each group of the plurality of groups exceeds the maximum overhead of each group of the plurality of groups.

2. The sounding method of claim 1, wherein the link conditions are selected from transmission rate, packet error rate (PER), and mobility of the plurality of stations.

3. The sounding method of claim 1, wherein the step of performing sounding to at least one of the plurality of groups according to the plurality of initial sounding instants and the plurality of sounding periods is performed in a group by group fashion and comprises:
   performing sounding of the plurality of groups sequentially starting at the plurality of initial sounding instants corresponding to the plurality of groups, and performing sounding of each group of the plurality of groups periodically with the sounding period corresponding to each group of the plurality of groups;
   wherein a plurality of sounding intervals of performing sounding of the plurality of groups are interleaved.

4. The sounding method of claim 3, further comprising:
   transmitting data packets to the plurality of groups between two consecutive sounding intervals of the plurality of sounding intervals; and
   evaluating a plurality of performance results of the plurality of groups according to the data packets;
   wherein the step of determining the plurality of maximum overheads corresponding to the plurality of groups is determining the plurality of maximum overheads corresponding to the plurality of groups according to the plurality of performance results of the plurality of groups.

5. The sounding method of claim 4, wherein the plurality of performance results of the plurality of groups is a plurality of goodput results of the plurality of groups.

6. The sounding method of claim 1, wherein the wireless communication system is a wireless local area network (WLAN) system.

7. A wireless communication system, comprising:
   a plurality of stations;
   a base station, comprising a processing unit and a storage unit, the storage unit configured to store a program code, the program code instructing the processing unit to perform the following step:
      classifying the plurality of stations into a plurality of groups, and determining a plurality of initial sounding instants and a plurality of sounding periods corresponding to the plurality of groups; and
      performing sounding to at least one of the plurality of groups according to the plurality of initial sounding instants and the plurality of sounding periods;
   wherein the program code further instructs the processing unit to perform following steps:
      determining a plurality of maximum overheads corresponding to the plurality of groups;
      classifying the plurality of stations into the plurality of groups according to link conditions of the plurality of stations;
      evaluating a total overhead of each group of the plurality of groups wherein the total overhead of each group of the plurality of groups is an accumulation of a plurality of airtime consumed by stations to perform sounding within each group of the plurality of groups; and
      discarding stations which have been classified into each group of the plurality of groups from each group of the plurality of groups when the total overhead of each group of the plurality of groups exceeds the maximum overhead corresponding to each group of the plurality of groups.

8. The wireless communication system of claim 7, wherein the link conditions are selected from transmission rate, packet error rate (PER), and mobility of the plurality of stations.

9. The wireless communication system of claim 7, wherein the program code further instructs the processing unit to perform the following step:
   performing sounding of the plurality of group sequentially starting at the plurality of initial sounding instants corresponding to the plurality of groups, and performing sounding of each group of the plurality of groups periodically with the sounding period corresponding to each group of the plurality of groups;
   wherein a plurality of sounding intervals of performing sounding of the plurality of groups are interleaved.

10. The wireless communication system of claim 9, wherein the program code further instructs the processing unit to perform following steps:
   the base station transmitting data packets to the plurality of groups between two consecutive sounding intervals of the plurality of sounding intervals; and
   evaluating a plurality of performance results of the plurality of groups according to the data packets;
   wherein the step of determining the plurality of maximum overheads corresponding to the plurality of groups is determining the plurality of maximum overheads corresponding to the plurality of groups according to the plurality of performance results of the plurality of groups.

11. The wireless communication system of claim 10, wherein the plurality of performance results of the plurality of groups is a plurality of goodput results of the plurality of groups.

12. The wireless communication system of claim 7, wherein the wireless communication system is a wireless local area network (WLAN) system.

* * * * *